(12) United States Patent
Lofthouse

(10) Patent No.: US 9,582,016 B2
(45) Date of Patent: Feb. 28, 2017

(54) BOOST CONVERTER WITH CAPACITIVE BOOST STAGES

(71) Applicant: Silicon Laboratories Inc., Austin, TX (US)

(72) Inventor: Sean Anthony Lofthouse, Pflugerville, TX (US)

(73) Assignee: Silicon Laboratories Inc., Austin, TX (US)

( * ) Notice: Subject to any disclaimer, the term of this patent is extended or adjusted under 35 U.S.C. 154(b) by 26 days.

(21) Appl. No.: 14/614,534

(22) Filed: Feb. 5, 2015

(65) Prior Publication Data

US 2016/0231759 A1    Aug. 11, 2016

(51) Int. Cl.
*G05F 1/56*    (2006.01)
*H02M 3/156*    (2006.01)

(52) U.S. Cl.
CPC .............. *G05F 1/56* (2013.01); *H02M 3/156* (2013.01)

(58) Field of Classification Search
CPC .............. H02M 3/06; H02M 3/07; G05F 1/56
See application file for complete search history.

(56) References Cited

U.S. PATENT DOCUMENTS

| | | | | |
|---|---|---|---|---|
| 5,914,587 A * | 6/1999 | Liu | ...................... | H02M 3/158 323/222 |
| 5,914,588 A * | 6/1999 | Jiang | ................... | H02M 1/4208 323/267 |
| 5,923,153 A * | 7/1999 | Liu | ...................... | H02M 3/158 323/222 |
| 6,051,961 A * | 4/2000 | Jang | ....................... | H02M 3/158 323/224 |
| 6,642,695 B1 * | 11/2003 | Huang | .................. | H02M 3/156 323/222 |
| 6,759,766 B2 * | 7/2004 | Hiratsuka | ............. | B41J 2/04541 307/110 |

(Continued)

OTHER PUBLICATIONS

Silicon Labs, "Design Guide for the Si3210/15/16 DC-DC Converter,"AN45, Rev. 0.61 Aug. 2009, pp. 1-16.

(Continued)

*Primary Examiner* — Timothy J Dole
*Assistant Examiner* — Yusef Ahmed
(74) *Attorney, Agent, or Firm* — Zagorin Cave LLP

(57) ABSTRACT

An apparatus includes an inductor coupled between an input voltage node and a switching node. The switching node selectively enables the inductor to generate a voltage on the switching node based on a voltage on the input voltage node. The apparatus includes a passive circuit configured to generate an intermediate voltage on an intermediate node with respect to a reference voltage and based on the voltage on the switching node. The apparatus includes a boost circuit configured to generate an output voltage on an output node referenced to the intermediate voltage, the output voltage has a magnitude with respect to the reference voltage greater than a magnitude of the intermediate voltage with respect to the reference voltage. The boost circuit may include n boost circuit stages, the intermediate voltage may be $V_I$, and the output voltage may be $(n+1) \times V_I$ with respect to the voltage on the reference node.

18 Claims, 3 Drawing Sheets

(56) References Cited

U.S. PATENT DOCUMENTS

| | | | | |
|---|---|---|---|---|
| 7,161,331 | B2* | 1/2007 | Wai | H02M 1/34 323/222 |
| 7,382,113 | B2* | 6/2008 | Wai | H02M 3/158 323/222 |
| 8,467,520 | B2 | 6/2013 | Zhou et al. | |
| 8,503,198 | B2* | 8/2013 | Pan | H02M 3/337 323/222 |
| 8,525,495 | B2* | 9/2013 | Werle | H02M 1/4208 323/259 |
| 8,912,768 | B1* | 12/2014 | Cho | H02M 3/156 323/222 |
| 2003/0071602 | A1* | 4/2003 | Ando | H02J 1/08 323/282 |
| 2005/0052170 | A1* | 3/2005 | Kim | H02M 3/07 323/282 |
| 2008/0088248 | A1* | 4/2008 | Myers | H02M 3/335 315/210 |
| 2008/0214132 | A1* | 9/2008 | Kurokawa | G06K 19/0723 455/272 |
| 2009/0110384 | A1* | 4/2009 | Lynch | H02M 7/48 396/133 |
| 2009/0243572 | A1* | 10/2009 | Mills | H02M 3/155 323/282 |
| 2010/0027297 | A1* | 2/2010 | Avrutsky | H02J 1/102 363/21.12 |
| 2010/0045251 | A1* | 2/2010 | Murota | H02M 3/158 323/282 |
| 2010/0085032 | A1* | 4/2010 | Duan | H02M 3/1584 323/351 |
| 2010/0301985 | A1* | 12/2010 | Luo | H02M 7/103 336/221 |
| 2011/0141785 | A1* | 6/2011 | Duan | H02M 7/4807 363/131 |
| 2011/0157933 | A1* | 6/2011 | Nagasaki | H02M 7/103 363/61 |
| 2011/0241629 | A1* | 10/2011 | Jordan | H02M 3/07 320/166 |
| 2012/0002800 | A1* | 1/2012 | Lofthouse | H04M 1/738 379/412 |
| 2012/0087162 | A1* | 4/2012 | Nagasaki | H02M 7/103 363/61 |
| 2012/0274304 | A1* | 11/2012 | Lin | H02M 3/158 323/311 |
| 2012/0287678 | A1* | 11/2012 | Xu | H02M 3/158 363/17 |
| 2013/0320953 | A1* | 12/2013 | Cassel | H02M 3/155 323/311 |
| 2014/0268893 | A1* | 9/2014 | Henry | B23K 9/1006 363/17 |
| 2014/0368035 | A1* | 12/2014 | Lofthouse | H02M 3/155 307/31 |
| 2015/0016158 | A1* | 1/2015 | Paik | H02M 7/12 363/62 |
| 2015/0137694 | A1* | 5/2015 | Hong | H05B 33/0815 315/205 |
| 2015/0188362 | A1* | 7/2015 | Mondal | H02M 3/156 307/52 |
| 2015/0214848 | A1* | 7/2015 | Umetani | H02M 3/07 363/21.12 |

OTHER PUBLICATIONS

Seeman, M., "A Design Methodology for Switched-Capacitor DC-DC Converters," Technical Report No. UCB/EECS-2009-78, May 21, 2009, pp. 102-118.

* cited by examiner

BOOST CONVERTER WITH CAPACITIVE BOOST STAGES

BACKGROUND

Field of the Invention

The present invention is related to power converters and more particularly to switch mode power converters.

Description of the Related Art

In general, battery-powered applications or other fixed power supply applications use power converters to generate usable voltage levels that differ from voltage levels provided to the applications. In an exemplary application, a subscriber line interface circuit (SLIC) provides a usable voltage level to a linefeed driver of a communications interface between the digital switching network of a central office and an analog subscriber line. The analog subscriber line connects to a subscriber station or telephone instrument at a location remote from the central office exchange. The analog subscriber line and subscriber equipment form a subscriber loop. The interface requirements of a SLIC result in the need to provide relatively high voltages and currents for control signaling with respect to the subscriber equipment on the subscriber loop. Voiceband communications are low voltage analog signals on the subscriber loop. Thus, the SLIC must detect and transform low voltage analog signals into digital data for transmitting communications received from the subscriber equipment to the digital network. For bi-directional communication, the SLIC must also transform digital data received from the digital network into low voltage analog signals for transmission on the subscriber loop to the subscriber equipment.

In general, the SLIC must be provided with a negative voltage supply sufficient to accommodate the most negative loop voltage while maintaining the SLIC internal circuitry in its normal region of operation. In order to ensure sufficient supply levels, a power supply providing a constant or fixed supply level sufficient to meet or exceed the requirements of all of these states may be provided. A typical SLIC uses switching circuitry (e.g., DC-DC converter) to generate appropriate supply levels from another fixed supply. The switching circuitry can be controlled to track the level needed by the SLIC and provide a variable supply level. Instead of multiple fixed power supplies to accommodate the different operational states, a single tracking supply varies its output supply level to meet the SLIC's needs.

The operational states of individual subscriber lines are inherently independent of each other and a separate SLIC and linefeed driver are provided for each subscriber line. Each tracking power supply varies its output power level in accordance with the requirements of its associated channel or device. However, such architecture may not be economical to implement, particularly with respect to a large number of channels.

SUMMARY OF EMBODIMENTS OF THE INVENTION

In at least one embodiment of the invention, an apparatus includes an inductor coupled between an input voltage node and a switching node. The switching node is configured to selectively enable the inductor to generate a voltage on the switching node based on a voltage on the input voltage node. The apparatus includes a passive circuit configured to generate an intermediate voltage on an intermediate node with respect to a reference voltage and based on the voltage on the switching node. The apparatus includes a boost circuit configured to generate an output voltage on an output node referenced to the intermediate voltage, the output voltage has a magnitude with respect to the reference voltage greater than a magnitude of the intermediate voltage with respect to the reference voltage. The boost circuit may include a plurality of boost circuit stages coupled to the switching node. The number of boost circuit stages may be n, the intermediate voltage may be $V_I$, and the output voltage may be $(n+1) \times V_I$ with respect to the voltage on the reference node.

In at least one embodiment of the invention, a method includes modulating current through an inductor based on a feedback signal to generate a first voltage. The method includes passively rectifying the first voltage to provide an intermediate voltage referenced to a reference voltage. The method includes boosting the intermediate voltage to generate an output voltage having a magnitude with respect to the reference voltage that is greater than a magnitude of the intermediate voltage with respect to the reference voltage. The passively rectifying may invert the first voltage with respect to the reference voltage. The method may include boosting the intermediate voltage in a plurality of stages. The intermediate voltage may be boosted by a number, n, of boost circuit stages and the boosted output voltage may be $(n+1) \times V_I$ with respect to the voltage on the reference node, where $V_I$ is the intermediate voltage.

In at least one embodiment of the invention, an apparatus includes an inductor coupled between an input voltage node and a switching node. The apparatus includes a switch coupled between the switching node and a first reference node. The apparatus includes a passive circuit coupled to an intermediate node, the switching node, and a second reference node. The apparatus includes a boost circuit coupled to the switching node, the intermediate node, and an output node.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

A switching power converter circuit suitable for various applications, e.g., a subscriber line interface circuit (SLIC), reduces a voltage on a switching node coupled to a primary switch of the switching power converter as compared to other switching power converter circuits. The switching power converter generally includes an inductive converter that may be used in a boost, buck, boost/buck, or other known configuration. The switching power converter is based on a single inductor and uses passive rectifiers to reduce the need for expensive switching transistors. The switching power converter provides an output power supply voltage and a feedback signal to a controller of the inductive converter. The switching power converter topology allows for reduction in voltage rating of a switch included in the inductive converter as compared to other switching power converter circuits. The reduced voltage rating requirement facilitates use of a smaller and/or faster switch, thereby reducing the cost of the power converter circuit. Although additional high-voltage-rated capacitors or diodes may be needed, the cost reduction of the switch exceeds additional cost of other circuit elements introduced by the switching power converter topology.

Figure 1:
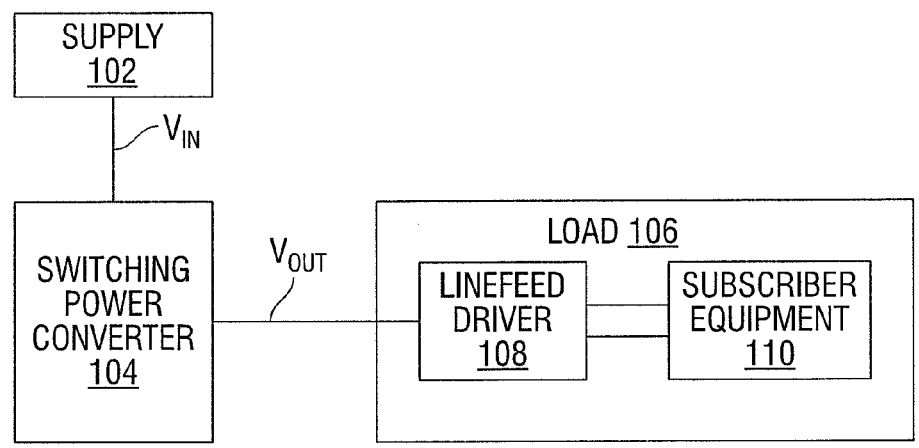
FIG. 1 illustrates a functional block diagram of a power conversion system.

Referring to FIG. 1, an exemplary fixed supply application includes a switching power converter 104, which generates an output voltage $V_{OUT}$ having a target level based on a fixed input voltage supply $V_{IN}$, provided by supply 102. The target level is based on specifications associated with load 106, which in an exemplary application is subscriber equipment 110 driven by linefeed driver 108. In an exemplary SLIC, $V_{IN}$ has a level in the range of 3.3 Volts (V) to 16 V and the target voltage level of output voltage $V_{OUT}$ is approximately 20 V-200 V and inverted with respect to a reference voltage.

Figure 2:
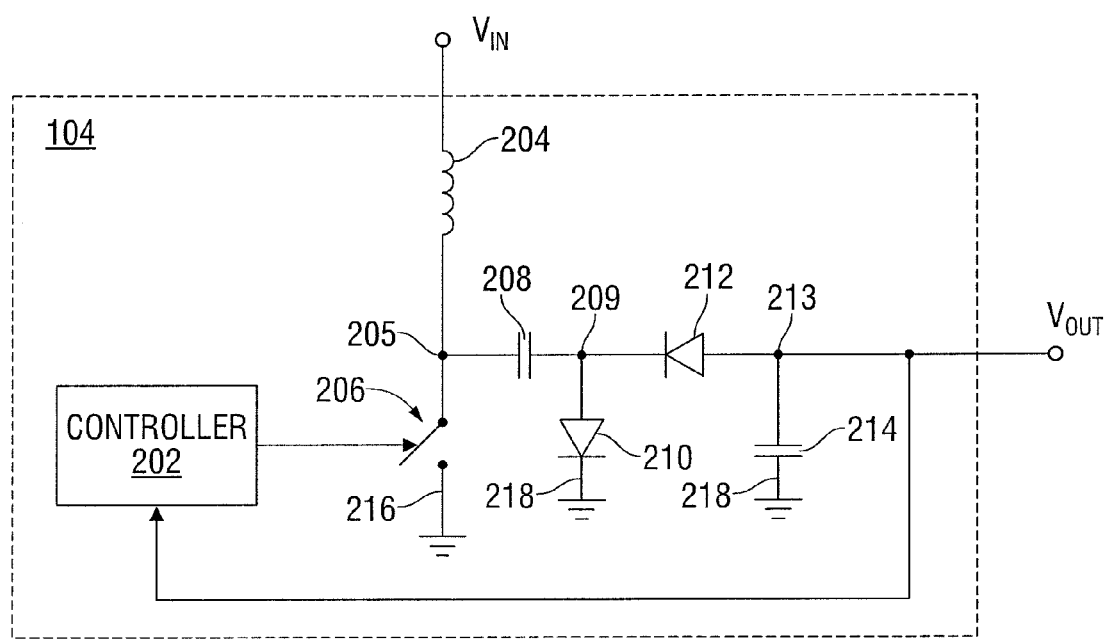
FIG. 2 illustrates a circuit diagram of an inverting switching power converter.

Referring to FIG. 2, switching power converter 104 uses a relatively small number of components to provide the output voltage. In particular, it uses inductor 204 instead of an expensive multiple winding transformer and a passive rectifier including inexpensive diodes rather than more expensive switching transistors. Since the rectifier is passive, controller 202 need not implement complex switching algorithms and may be integrated with other circuits such as codecs, filters, and tone and ringing generators, on a low-cost SLIC chip.

Still referring to FIG. 2, switching power converter 104 may have an inverting topology, i.e., $V_{OUT}$ has a polarity opposite that of $V_{IN}$ with respect to a ground reference node. Switching power converter 104 includes inductor 204 coupling an input supply node to switching node 205. Capacitor 208 couples switching node 205 to diode node 209. Diode 210 couples diode node 209 to reference node 218. Diode 212 couples the diode node to node 213. Capacitor 214 couples node 213 to reference node 218. Switch 206 selectively couples switching node 205 to reference node 216 according to a switch control signal. Controller 202 generates the switch control signal such that a load coupled to node 213 will always see a voltage, $V_{OUT}$, greater than that of the input supply voltage, $V_{IN}$, alone.

When switch 206 is closed, the input voltage $V_{IN}$ appears across inductor 204, causing a change in current flowing through the inductor during the time period that the switch is closed (i.e., the duty cycle). During this time, diode 212 is forward-biased and current flows from capacitor 214 through diode 212, capacitor 208, and switch 206. When switch 206 is open, inductor 204 is coupled in series with capacitor 208 and diode 210 and current flows through those elements. The inductor transfers energy accumulated during the closed state to capacitor 208. Controller 202 opens switch 206 again before capacitor 208 and capacitor 214 discharge too much. Capacitor 208 and capacitor 214 are sized large enough for any voltage ripple across the capacitors to be negligible. Capacitor 208 transfers energy between switching node 205 and node 213 in accordance with the commutation of switch 206 and causes the output voltage $V_{OUT}$ to be negative with respect to reference node 218.

Diode 210 is oriented to be forward-biased when switch 206 is open (i.e., switching node 205 is decoupled from reference node 216), thereby charging capacitor 208 and switching node 205 to voltage $V_{DPEAK}$ with respect to reference node 216. Diode 212 is oriented to be forward-biased when switch 206 is closed (i.e., switching node 205 is coupled to reference node 216), thereby discharging node 213 to a negative voltage level with respect to reference node 218 (e.g., $V_{OUT}=-V_{DPEAK}$). Note that reference nodes 216 and 218 may both be coupled to the same ground node. However, note that in other embodiments, reference nodes 216 and 218 may be coupled to different reference nodes corresponding to negative supply nodes or ground nodes for different voltage planes. At steady state, the ratio of output voltage $V_{OUT}$ to the input voltage $V_{IN}$ may be approximated as $$\left|\frac{V_{OUT}}{V_{IN}}\right| = \frac{1}{1-D},$$

where D is the duty cycle, i.e., the fraction of the commutation period T during which switch 206 is closed. Note that the output voltage is greater than the input voltage although the actual transfer function may vary due to non-idealities in actual circuit elements. In at least one embodiment of switching power converter 104, the controller configures the inductor to operate in a discontinuous mode and the output voltage is a function of the peak inductor current and inductance value for inductor 204.

Controller 202 receives $V_{OUT}$ as a feedback signal and regulates the switching of transistor 206 based on a deviation of $V_{OUT}$ (or a fraction thereof) from a reference voltage. In some embodiments, controller 202 includes an integrated circuit switching regulator that operates using a much smaller power supply voltage than $V_{IN}$, and $V_{OUT}$ is reduced in magnitude before comparing it to the reference voltage. Controller 202 can achieve this reduction either using discrete resistors or resistors integrated on the integrated circuit. Note that FIG. 2 omits additional details related to the operation of controller 202 that are well known in the art. For example, controller 202 may implement current mode control by receiving inputs to measure the voltage across a reference resistor connected to the second current electrode of switch 206 to determine the amount of current flowing through switch 206. As discussed above, in an exemplary application, controller 202 is included in an integrated circuit SLIC and the control loop is a digital control loop. However, the switching regulator control may be implemented as an analog control. In various embodiments, the signal processor of the SLIC is an integrated circuit and the components forming the control loop are fabricated as a portion of the integrated circuit signal processor.

In at least one embodiment, switch 206 is a power metal oxide semiconductor field-effect transistor (MOSFET) designed to handle substantial power levels and have high commutation speed. A typical power MOSFET used in switching applications has a vertical structure, although some power MOSFETS having a planar structure may be used. The vertical structure of the typical power MOSFET causes the power MOSFET to have low gain, in general. Using the topology of FIG. 2, to implement an output voltage, $V_{OUT}$, having a voltage level in the range of approximately 100 V-200 V, as required by some applications, the peak voltage on switching node 205, $V_{DPEAK}$, must be substantial (e.g., 100 V-200 V or more). The peak voltage level on switching node 205 determines the voltage rating (e.g., breakdown voltage) required for switch 206. Power MOSFETS that can withstand greater voltages are substantially more expensive than those with lower voltage ratings. Exemplary power MOSFETS have standard voltage ratings of 60 V, 100 V, 150 V, and 200 V. By reducing the peak voltage that may be developed on switching node 205, the voltage rating of switch 206 may be reduced, thereby reducing the cost of switching power converter 104. In addition, power MOSFETs with a lower voltage rating may be smaller and faster than those with greater voltage ratings.

Figure 3:
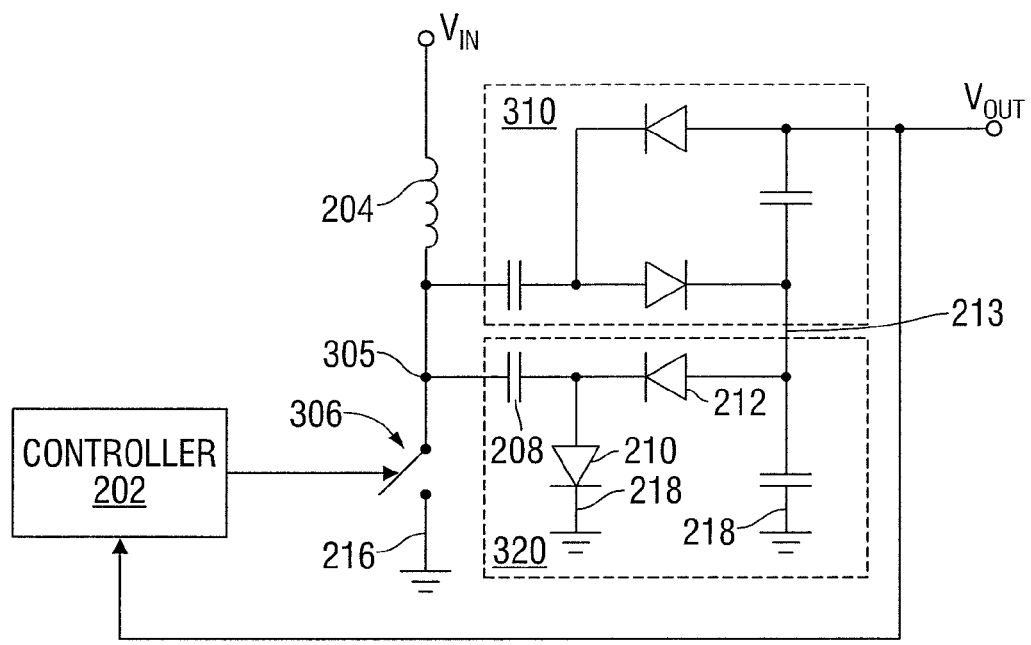
FIG. 3 illustrates a circuit diagram of a switching power converter consistent with at least one embodiment of the invention.

Referring to FIG. 3, in at least one embodiment of a switching power converter, the peak voltage on switching node 305 is reduced from that of switching nodes 205 of FIG. 2, thereby reducing the required voltage rating of switch 306 of the inductive converter circuit of FIG. 3 from the required voltage rating of switch 206 of FIG. 2. Referring back to FIG. 3, passive circuit 320 is coupled to boost circuit 310, both of which are coupled to switching node 305. Boost circuit 310 operates similar to passive circuit 320, which operates similar to the operation described above for the passive circuit of FIG. 2. However, referring back to FIG. 3, rather than be referenced to the reference node 218 like passive circuit 320, boost circuit 310 is referenced to the voltage generated on node 213 by passive circuit 320. Accordingly, the voltage on $V_{OUT}$ equals approximately $2 \times V_I$, where $V_I$ is an intermediate voltage level generated on intermediate node 213 and generated with respect to reference node 218 (e.g., ground). Since boost circuit 310 includes identical, matched elements as passive circuit 320 and both boost circuit 310 and passive circuit 320 are coupled to switching node 305, the voltage difference between the voltage level on output node $V_{OUT}$ and node 213 has the same magnitude, $|V_I|$ as the voltage difference between the voltage on node 213 with respect to reference node 218. Thus, the voltage on output node $V_{OUT}=2\times|V_I|$. Note that actual implementation may vary due to manufacturing mismatch of devices and $V_{OUT} \approx 2\times|V_I|$, but within specification tolerance. Accordingly, the peak voltage on node 305 may be reduced by a factor of 2 from $V_{DPEAK}$ of 104 of FIG. 2. In at least one embodiment, controller 202 operates at voltages of 5V or less, $V_I \approx V_{DPEAK} \sim 50V-100V$ and $V_{OUT}$ may have voltage levels of 100V-200V. The peak voltage on switching node 305 is 50V-100V as compared to the voltage range of 100V-200V for the circuit topology of FIG. 2. Accordingly, a power MOSFET used to implement switch 306 may have a breakdown voltage, $V_{BV}$, less than $V_{OUT}$, e.g., where $V_{OUT}$ is 100 V, $V_{IN}$ has a level in the range of 3.3 V to 16 V, $V_{BV}$ is 60 V and the drain-to-source resistance of the power MOSFET when it is in the 'on' state, $R_{dson}$, is <100 mOhms.

Figure 4:
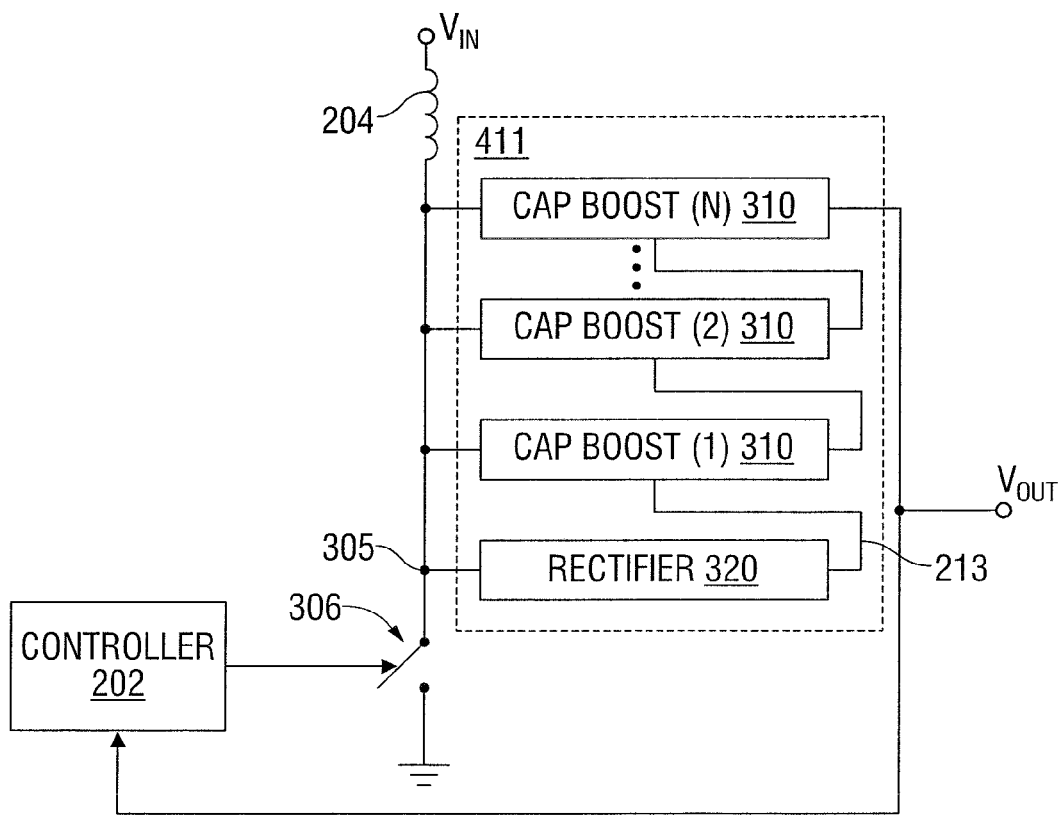
FIG. 4 illustrates a functional block diagram of a switching power converter consistent with at least one embodiment of the invention.

Referring to FIG. 4, in at least one embodiment of the switching power converter, the peak switching voltage may be reduced by a factor of N+1 by including N boost circuits 310. Each of the boost circuits 310 generates a voltage difference with respect to the output voltage level of an adjacent boost circuit 310. Note that under some circumstances, the switched power converter topology of FIG. 4 may become frequency dependent due to capacitive transfers. For example, when $|V_{OUT}| \leq n \times |V_{IN}|$, the switched power converter will operate like a switched capacitor and appear like a supply of $n \times V_{IN}$ through a resistor of $1/(f \times C)$, where f is the switching frequency of switch 306 and C is the capacitance of capacitor 208, as illustrated in FIG. 3. In addition, a minimum $V_{OUT}$ level exists of $n \times V_{IN}$ since regulating the output voltage to a level that is less than $n \times V_{IN}$, may generate ripple on $V_{OUT}$ that is outside of a target specification. Accordingly, a power MOSFET used to implement switch 306 may have a breakdown voltage, $V_{BV}$, less than $V_{OUT}$, e.g., where $V_{OUT}$ is 100 V, n=3, $V_{IN}$ has a level in the range of 3.3 Volts (V) to 16 V, $V_{BV}$ is 40 V and the drain-to-source resistance of the power MOSFET when it is in the 'on' state, $R_{dson}$, is <60 mOhms. The technique may introduce delay due to the additional boost stages, which may reduce efficiency of the voltage conversion. The control loop must account for this delay, e.g., by having a dominant pole sufficient to provide stability for the large output. Although the topologies of FIGS. 3 and 4 require additional capacitors and high voltage diodes, the additional circuit elements are less expensive than a higher voltage rating MOSFET required by the topology of FIG. 2, thereby reducing the total cost of the switching power converter of FIGS. 3 and 4. Note that in other embodiments, each diode included in boost circuit 310 or passive circuit 320 may be implemented by multiple diodes of appropriate sizes in coupled parallel and each capacitor may be implemented by multiple capacitors of appropriate sizes in coupled parallel.

Figure 5:
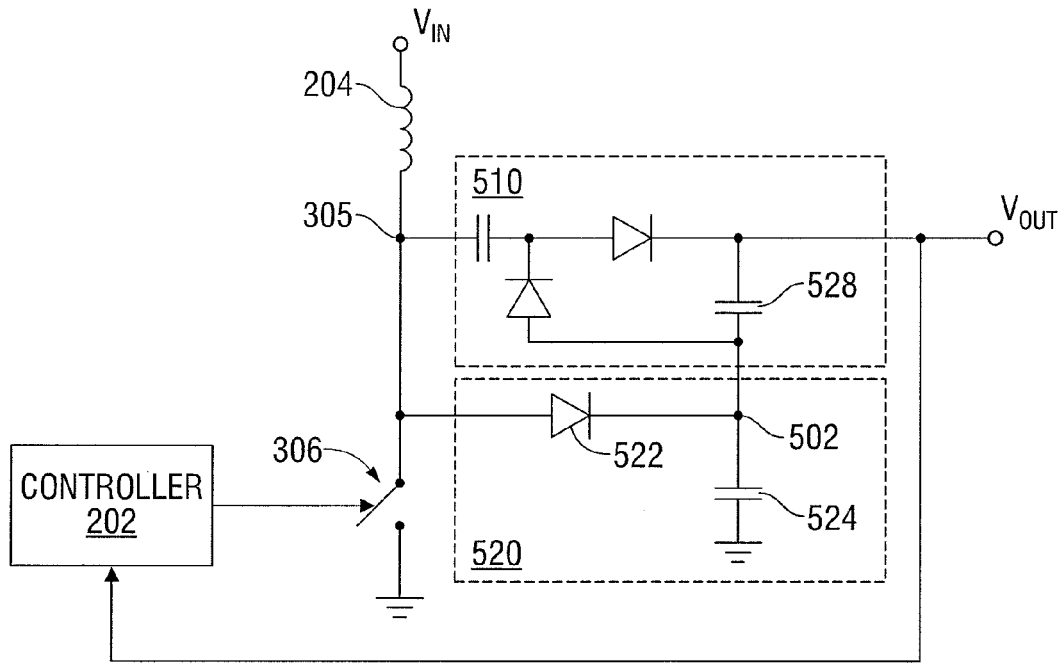
FIG. 5 illustrates a circuit diagram of a non-inverting switching power converter consistent with at least one embodiment of the invention.
Figure 6:
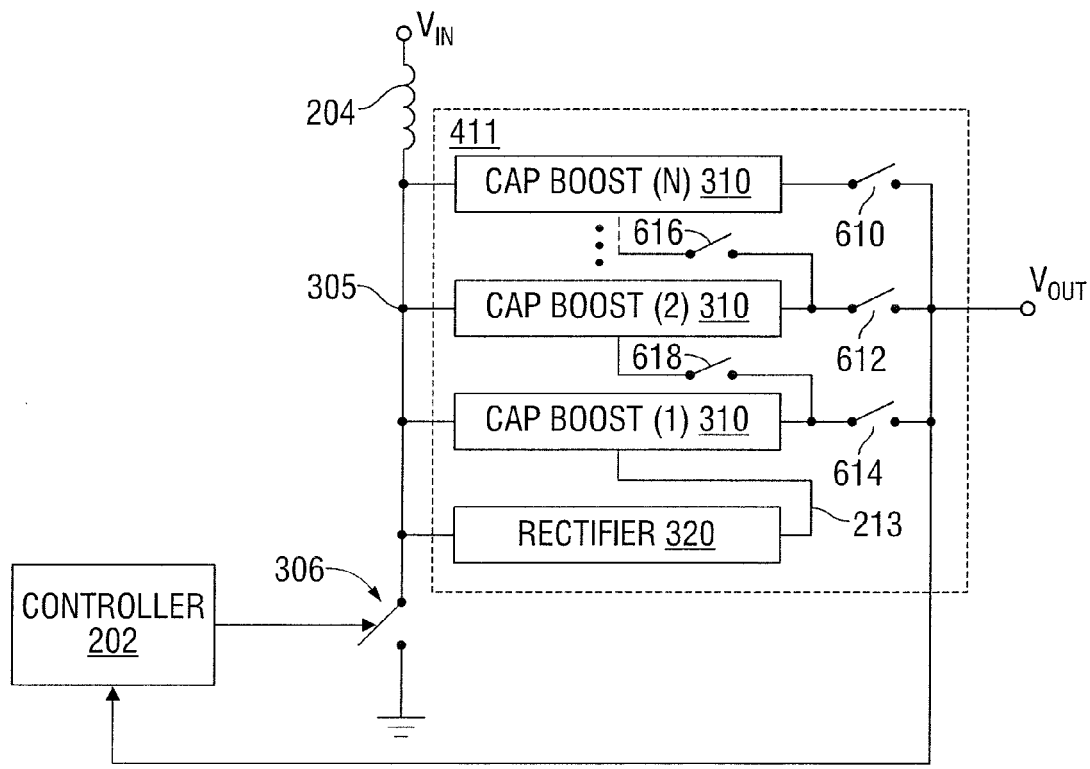
FIG. 6 illustrates a functional block diagram of a switching power converter with a selectable boost level consistent with at least one embodiment of the invention.

The switching power converter technique may be adapted for non-inverting boost converter embodiments, as illustrated in FIG. 5, which include diodes coupled in an opposite direction between switching node 305 and node 502 or output node $V_{OUT}$. In at least one embodiment of a switching power converter, the amount of peak switching voltage reduction may be selectable by controller 202, or other suitable technique. For example, referring to FIG. 6, N boost circuits may be selectively coupled to reduce the peak switching voltage on switching node 305 by a factor of n, where $2 \leq n \leq N+1$, by configuring switches (e.g., switches 610, 612, 614, 616, and 618) accordingly. For n=2, switch 614 is closed and 610, 612, 616, and 618 are open. For n=3, switches 618 and 612 are closed and other switches, including switches 614, 610, and 616, are open. In at least one embodiment, closed switches may be realized by zero Ohm resistors and open switches may be realized by a high impedance, or by an open circuit on a board level design.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which $V_{IN}$ is a positive voltage level in a particular voltage range and $V_{OUT}$ is a negative voltage level in a particular voltage range, one of skill in the art will appreciate that the teachings herein can be utilized with voltages of different polarities with respect to a reference voltage e.g., negative input voltages and/or positive output voltages, and with different voltage ranges. In addition while the invention has been described in an embodiment in which the intended application is a SLIC application, one of skill in the art will appreciate that the teachings herein can be utilized in power converter circuits for other applications. Variations and modifications of the embodiments disclosed herein, may be made based on the description set forth herein, without departing from the scope and spirit of the invention as set forth in the following claims.

What is claimed is:

1. An apparatus comprising:
   an inductor coupled between an input voltage node and a switching node;
   a switch configured to selectively enable the inductor to generate a voltage on the switching node based on a voltage on the input voltage node;
   a passive circuit configured to receive the voltage on the switching node and a reference voltage on a reference node and configured to generate an intermediate voltage on an intermediate node with respect to the reference voltage based on the voltage on the switching node, the passive circuit comprising:
      a first capacitor coupled between the switching node and a first node;
      a first diode coupled to conduct current from the first node to the reference node;
      a second diode coupled to conduct current from the intermediate node to the first node; and
      a second capacitor coupled between the intermediate node and the reference node; and
   a boost circuit configured to receive the voltage on the switching node and the intermediate voltage and configured to generate an output voltage on an output node referenced to the intermediate voltage, the output voltage having a magnitude with respect to the reference voltage greater than a magnitude of the intermediate voltage with respect to the reference voltage.

2. The apparatus, as recited in claim 1, wherein the boost circuit comprises:
   a plurality of boost circuit stages coupled to the switching node.

3. The apparatus, as recited in claim 2, wherein the plurality of boost circuit stages includes a number, n, of boost circuit stages, the intermediate voltage is $V_I$, and the output voltage is $(n+1) \times V_I$ with respect to the reference voltage on the reference node.

4. The apparatus, as recited in claim 3, wherein the number, n, of boost circuit stages is selectable.

5. The apparatus, as recited in claim 2, wherein each of the plurality of boost stages is directly coupled to the switching node.

6. The apparatus, as recited in claim 1, wherein the passive circuit is an inverting rectifier circuit.

7. The apparatus, as recited in claim 1, wherein the boost circuit comprises:
   a third capacitor coupled between the switching node and a second node;
   a third diode coupled to conduct current from the second node to the intermediate node;
   a fourth diode coupled to conduct current from the output node to the second node; and
   a fourth capacitor coupled between the output node and the intermediate node.

8. The apparatus, as recited in claim 1, wherein the output voltage, $V_{OUT}$, is twice the intermediate voltage.

9. The apparatus, as recited in claim 8, wherein the switch comprises a power MOSFET of a first type and having a breakdown voltage, $V_{BV}$, of approximately $V_{OUT}$ or less.

10. The apparatus, as recited in claim 1, wherein the passive circuit is directly coupled to the switching node and directly coupled to the reference node and the boost circuit is directly coupled to the switching node and directly coupled to the intermediate node.

11. A method comprising:
    modulating current through an inductor based on a feedback signal to generate a first voltage on a switching node;
    passively rectifying the first voltage to provide an intermediate voltage on an intermediate node with respect to a reference voltage on a reference node, the passively rectifying comprising:
       capacitively coupling the switching node to a first node;
       conducting current from the first node to the reference node and blocking conduction of current from the reference node to the first node;
       conducting current from the intermediate node to the first node and blocking conduction of current from the first node to the intermediate node; and
       capacitively coupling the intermediate node and the reference node; and
    boosting the intermediate voltage using the first voltage on the switching node to generate an output voltage having a magnitude with respect to the reference voltage greater than a magnitude of the intermediate voltage with respect to the reference voltage.

12. The method, as recited in claim 11, wherein the passively rectifying inverts the first voltage with respect to the reference voltage.

13. The method, as recited in claim 11, further comprising:
    boosting the intermediate voltage in a plurality of stages.

14. The method, as recited in claim 13, wherein the intermediate voltage is boosted by a number, n, of boost circuit stages and the boosted output voltage is $(n+1) \times V_I$ with respect to the reference voltage on the reference node, where $V_I$ is the intermediate voltage.

15. The method, as recited in claim 13, further comprising:
    selecting the number of boost circuit stages.

16. The method, as recited in claim 11, wherein the output voltage is at least twice the intermediate voltage.

17. An apparatus comprising:
    an inductor coupled between an input voltage node and a switching node;
    a switch coupled between the switching node and a first reference node;
    a passive circuit coupled to an intermediate node, the switching node, and a second reference node, wherein the passive circuit comprises:
       a first capacitor connected between the switching node and a first node;
       a first diode coupled to conduct current from the first node to the second reference node;
       a second diode coupled to conduct current from the intermediate node to the first node;
       a second capacitor coupled between the intermediate node and the second reference node; and
    a boost circuit coupled to the switching node, the intermediate node, and an output node, the boost circuit comprising:

a third capacitor connected between the switching node and a second node;
   a third diode coupled to conduct current from the second node to the intermediate node;
   a fourth diode coupled to conduct current from the output node to the second node; and
   a fourth capacitor coupled between the output node and the intermediate node.

18. The apparatus, as recited in claim 17,
wherein the output voltage, $V_{OUT}$, is at least twice an intermediate voltage on the intermediate node, and
wherein the switch comprises a power MOSFET of a first type and has a breakdown voltage, $V_{BV}$, of approximately $V_{OUT}$ or less.

* * * * *